United States Patent [19]

Lown et al.

[11] Patent Number: 5,650,131

[45] Date of Patent: Jul. 22, 1997

[54] PROCESS FOR MAKING GOETHITE

[75] Inventors: Jean A. Lown, St. Paul; Gerald G. Endres, Hastings, both of Minn.

[73] Assignee: Minnesota Mining and Manufacturing Company, St. Paul, Minn.

[21] Appl. No.: 359,004

[22] Filed: Dec. 19, 1994

Related U.S. Application Data

[63] Continuation of Ser. No. 144,334, Nov. 1, 1993, abandoned.

[51] Int. Cl.$^6$ ............................................. C01G 49/02
[52] U.S. Cl. ........................................... 423/632; 423/633
[58] Field of Search .................................. 423/632, 633, 423/634; 252/62.56

[56] References Cited

U.S. PATENT DOCUMENTS

| | | | |
|---|---|---|---|
| 3,931,025 | 1/1976 | Woditsch et al. | 252/62.62 |
| 4,061,727 | 12/1977 | Vaeth et al. | 423/633 |
| 4,112,063 | 9/1978 | Buxbaum et al. | 423/633 |
| 4,202,871 | 5/1980 | Matsumoto et al. | 423/632 |
| 4,209,412 | 6/1980 | Marcot | 252/62.62 |
| 4,226,909 | 10/1980 | Kanten | 428/329 |
| 4,321,302 | 3/1982 | Umeki et al. | 428/404 |
| 4,323,464 | 4/1982 | Umeki | 252/62.59 |
| 4,379,183 | 4/1983 | Araki et al. | 427/127 |
| 4,414,196 | 11/1983 | Matsumoto et al. | 423/633 |
| 4,560,544 | 12/1985 | Nakata et al. | 423/633 |
| 4,755,395 | 7/1988 | Steck et al. | 427/127 |
| 4,773,931 | 9/1988 | Mishima et al. | 75/251 |
| 4,873,010 | 10/1989 | Takedoi et al. | 252/62.59 |
| 5,137,783 | 8/1992 | Tanihara et al. | 428/407 |
| 5,139,767 | 8/1992 | Matsunaga et al. | 423/632 |

FOREIGN PATENT DOCUMENTS

| | | | |
|---|---|---|---|
| 1103069 | 6/1981 | Canada. | |
| 0377933 | 7/1990 | European Pat. Off.. | |
| 0391743 | 10/1990 | European Pat. Off.. | |
| 0466338 | 1/1992 | European Pat. Off.. | |
| 2 335 454 | 12/1976 | France | C01G 49/02 |
| 50-80999 | 7/1975 | Japan. | |
| 59-045931 | 3/1984 | Japan. | |
| 59-232922 | 12/1984 | Japan. | |
| 60-21307 | 2/1985 | Japan. | |
| 60-92401 | 5/1985 | Japan. | |
| 60-112626 | 6/1985 | Japan. | |
| 60-170906 | 9/1985 | Japan. | |
| 60-262906 | 12/1985 | Japan. | |
| 61-9505 | 1/1986 | Japan. | |
| 60-9506 | 1/1986 | Japan. | |
| 61-174119 | 8/1986 | Japan. | |
| 62-78119 | 4/1987 | Japan. | |
| 62-158801 | 8/1987 | Japan. | |
| 01 115 827 | 10/1987 | Japan. | |
| 63-242930 | 8/1988 | Japan. | |
| 64-42327 | 2/1989 | Japan. | |
| 64-42329 | 2/1989 | Japan. | |
| 1-18961 | 4/1989 | Japan. | |
| 1-115827 | 5/1989 | Japan. | |
| 01 212 232 | 8/1989 | Japan | C01G 49/02 |
| 1-212232 | 8/1989 | Japan | 423/632 |
| 2-51429 | 2/1990 | Japan. | |
| 2-172826 | 7/1990 | Japan. | |
| 2-172827 | 7/1990 | Japan. | |
| 2-172828 | 7/1990 | Japan. | |
| 2-178903 | 7/1990 | Japan. | |
| 2-180718 | 7/1990 | Japan. | |
| 3-223120 | 8/1991 | Japan. | |
| 2-275523 | 12/1991 | Japan. | |
| 4-00311 | 1/1992 | Japan. | |

*Primary Examiner*—Steven Bos
*Attorney, Agent, or Firm*—Gary L. Griswold; Roger R. Tamte

[57] ABSTRACT

Spindle-shaped goethite particles are produced by oxidizing a ferrous carbonate intermediate in the presence of a growth modifier, or alternatively by changing the flowrate of oxidizing gas during oxidation. The goethite particles thus produced have a narrow size distribution, high aspect ratio and are substantially dendrite-free. These properties make the inventive goethite particles suitable for use in preparation of high density magnetic recording media.

10 Claims, 4 Drawing Sheets

PROCESS FOR MAKING GOETHITE

This is a continuation of Application Ser. No. 08/144,334 filed Nov. 1, 1993, now abandoned.

TECHNICAL FIELD

The present invention relates to a method of producing spindle-shaped goethite (alpha-ferric oxyhydroxide) particles useful in the production of iron oxide or metal particles for use in magnetic recording media.

BACKGROUND

Magnetic recording media have a magnetizable layer which imparts characteristic properties such as coercivity ($H_c$) and residual magnetic flux density ($B_r$) to the media. Growing demands for high density recording media require such properties to be maximized.

Magnetic powders of acicular Fe metal, gamma-$Fe_2O_3$ (mag-hematite) or $Fe_3O_4$ (magnetite) are widely used in magnetizable coatings. These particles preferably exhibit high dispersibility in the coating slurry, high packing density in the coated film and high coercivity. Such particles typically have a narrow size distribution, a relatively large aspect ratio (major axis/minor axis) and are substantially free of dendrites (particle branching) or other irregularities.

Known acicular or spindle-shaped magnetic particles can be prepared by dehydrating acicular goethite (alpha-ferric oxyhydroxide) to form hematite (alpha-$Fe_2O_3$), reducing to Fe metal or magnetite ($Fe_3O_4$), and oxidizing at temperatures of at least 200° C. to gamma-$Fe_2O_3$. The gamma-$Fe_2O_3$ particles may be further modified with cobalt by known methods to increase their coercivity.

The size, shape and distribution of the starting goethite particles directly affect the size, shape and distribution of the resulting magnetic particles. Therefore, goethite particles which have a spindle or acicular shape with sufficiently large aspect ratio, are uniform in size, and are substantially free of dendrites will contribute to obtaining the desired magnetic properties of the finished magnetic recording media.

Several processes are known for producing acicular goethite particles. In a first method, the goethite may be prepared at pH less than 6 by first reacting a ferrous salt and an alkali hydroxide in solution to precipitate a ferrous hydroxide precursor and then oxidizing the precipitate slurry to goethite. One of the major problems with this method is that sulfur remains as an impurity in the goethite, and this tends to promote sintering upon reduction to magnetite or iron metal. The particles also tend to be bundled.

Goethite may also be prepared by oxidizing a slurry of ferrous hydroxide in excess caustic so that the pH is greater than about 11. The high pH process produces goethite particles with high aspect ratio and low sulfur content, but the particles tend to have a broad size distribution.

Another method involves oxidizing goethite from ferrous carbonate, rather than ferrous hydroxide, with pH generally between 8 and 11. This process tends to produce uniform, spindle-shaped particles with low sulfur content and few dendrites, but with small aspect ratios, if the oxidation temperature is held between about 30° C. and 50° C. If the temperature is raised above 50° C., the size uniformity of the goethite may deteriorate and cubic magnetite impurities tend to form.

DISCLOSURE OF THE INVENTION

A new process for making spindle-shaped goethite particles has been developed comprising the steps of:

a) mixing a water-soluble iron-containing compound and a water-soluble alkali carbonate compound into an aqueous solution having a molar excess of alkali carbonate sufficient to cause a chemical reaction between the two compounds, wherein the iron-containing compound and the alkali carbonate compound are salts whose counterions in the solution do not interfere with the reaction to form goethite, b) reacting the resulting aqueous solution at an elevated temperature (about 30°–70° C.) sufficient to support the reaction between the iron-containing compound and the alkali carbonate compound in an inert gas atmosphere to yield a precipitate in suspension, c) while maintaining elevated temperature, aging the precipitate in suspension for a time sufficient to allow a ferrous carbonate intermediate to form, d) oxidizing the iron-containing compound or compounds resulting from step c) by introducing an oxygen-containing gas into the mass resulting from step c) while maintaining a temperature sufficient to produce substantially crystalline spindle-shaped goethite particles being substantially free of dendrites, and e) introducing an effective amount of a water soluble compound for modifying goethite particle growth and morphology into the reaction during either steps a), b), or c) or during step d) before 20% by weight of the iron in the iron-containing compound or compounds has been oxidized.

Another improved process has been invented in which steps a)–c) are basically the same as previously described and which further comprises the steps of:

d) oxidizing the iron-containing compound or compounds resulting from step c) by introducing an oxygen-containing gas at a controlled flowrate into the mass resulting from step c) while maintaining an elevated temperature (about 30°–50° C.) sufficient to support the oxidation reaction. The gas is introduced in at least two stages so that no more than 30% of the iron containing compound or compounds in the mass is oxidized in a first stage at a rate R while maintaining a first gas flowrate F1, assuming that substantially all the oxygen introduced at flowrate F1 reacts with an iron-containing compound. In subsequent stages, the remaining percentage of iron-containing compound or compounds is oxidized at flowrates progressively higher than F1. If the oxidation is conducted in two stages, a second flowrate F2 is at least twice F1. In this process, R is at least 0.06 moles of Fe/hour-liter of total batch volume, thereby obtaining substantially crystalline acicular goethite particles being substantially free of dendrites.

The first process described above (which will be referred to herein as the growth modifier process) and the second process (which will be called the multiple-rate process) can be combined into a single process in which both a growth modifier and at least two oxidation rates are utilized.

The inventive methods produce spindle-shaped goethite particles useful in the production of magnetic iron oxide particles for use in magnetic recording media. The goethite particles thus produced are narrow in size distribution, are substantially free of dendrites and other irregularities when viewed at 42,000 times magnification and have a sufficiently large aspect ratio to impart good properties for high density recording.

As used herein, the expression "substantially free of dendrites" is intended to mean that when viewed under magnification virtually all goethite particles appear to have a straight, unbranched spindle shape.

DETAILED DESCRIPTION

Figure 1:
FIG. 1 is an electron photomicrograph at 26,000 times magnification showing goethite particles made according to one embodiment of the invention as described in Example 1.

Useful iron-containing compounds in the present invention include water-soluble iron (II) salts such as ferrous sulfate, ferrous chloride, ferrous acetate, ferrous bromide, ferrous perchlorate, ferrous iodide, ferrous nitrate, ferrous thiocyanate, and ferrous thiosulfate. Alkali carbonate compounds useful in the present invention are water-soluble salts such as sodium carbonate, potassium carbonate, lithium carbonate, ammonium carbonate, cesium carbonate, rubidium carbonate, thallium carbonate, sodium bicarbonate, potassium bicarbonate, lithium bicarbonate, ammonium bicarbonate, cesium bicarbonate, and rubidium bicarbonate. These compounds may be chosen by those skilled in the art so that the counterion in solution does not interfere with the reaction to form goethite.

Growth modifiers useful in this invention are water-soluble compounds containing phosphorous, silicon or arsenic which are stable in an alkaline medium and capable of forming a complex with ferrous iron to modify goethite particle growth and morphology. Preferable growth modifiers include alkali metal phosphates such as sodium phosphate, potassium phosphate, ammonium phosphate, and lithium phosphate. Other effective phosphorous-containing growth modifiers include polyphosphates such as sodium tripolyphosphate ($Na_5P_3O_{10}$), phosphonic acids and acid salts such as DEQUEST 2006 aminotri(methylene phosphonic acid) penta sodium salt from Monsanto, and phosphoric acids and acid salts such as difluorophosphoric acid, hypophosphoric acid, metaphosphoric acid, monofluorophosphoric acid, orthophosphoric acid,and pyrophosphoric acid. Useful growth modifiers also include alkali metal silicates such as sodium silicate, potassium silicate, lithium silicate and ammonium silicate. Arsenic acids and acid salts such as metaarsenic acid, orthoarsenic acid and pyroarsenic acid may also be used as growth modifiers.

More details of the inventive process will be provided referring to the process steps by the letter designation given above under Disclosure of the Invention.

In step a), an iron-containing compound is mixed with deionized water in a suitable container such as a glass beaker along with an acid, such as 18 molar (M) sulfuric acid such that the pH is about 2. The presence of acid minimizes the formation of ferric ions in the iron-containing solution. The quantity of iron-containing compound is chosen so that the concentration of iron in the total batch volume is between 0.1 and 0.6 g-moles/liter, preferably 0.4 to 0.6 g-moles/liter. A concentration of less than 0.1 g-moles/liter may produce an inefficient yield of goethite from the finished batch, while a concentration of greater than 0.6 moles/liter may result in a substantial increase in goethite size distribution. The iron-containing compound is dissolved preferably while agitating the mixture using a method such as magnetic stirring. The mixing is preferably accomplished under an inert gas atmosphere, which is provided for example by introducing a flow of $N_2$ gas into the solution through a stainless steel purge tube. In a reactor vessel large enough to accommodate the desired total batch volume, an alkali carbonate compound is dissolved with water, preferably with stirring and heating under an inert gas atmosphere. The quantity of alkali carbonate compound added is chosen so that the molar ratio of carbonate ions to ferrous ions in the reaction is greater than one and preferably is in the range of 1.5 to about 2.5. The excess of carbonate ions drives the reaction between the iron-containing compound and the alkali carbonate compound toward formation of a ferrous carbonate intermediate.

In step b), the iron-containing solution and the alkali carbonate solution are combined, preferably by adding the iron-containing solution to the alkali carbonate solution in the reactor while agitating the mixture. An immediate reaction causes the formation of a whitish precipitate. An effective method of agitation for example uses a Cowles type mixer with a top entering drive shaft, the mixer disk having a series of flat rectangular blades alternately extending from the top and bottom of the disk around its perimeter parallel to the axis of the drive shaft. The ratio of the mixer disk diameter to the reactor diameter is about 0.45. It operates at a speed of about 1600 rpm in a 3 liter reactor vessel. Other methods of agitation are described in Section 19 of *Perry's Chemical Engineers' Handbook*. As a less-preferable alternative to dissolving the iron-containing compound and the alkali carbonate compound in separate aqueous solutions, all compounds may be dissolved in the reactor simultaneously. The resulting slurry is a basic medium with pH in the range of 8 to 11.

After the initial reaction occurs, step c) involves aging the contents of the reactor in an inert gas atmosphere for a time generally ranging from 15 to 120 minutes, preferably 30 to 90 minutes to complete the reaction between ferrous and carbonate ions. During the aging, an inert gas atmosphere is maintained by a method such as covering the surface of the mixture with a steady flow of N2 gas while preferably agitating the mixture using the Cowles type mixer at 1600 rpm as described above. The speed of mixing for a particular vessel must be sufficient to maintain the precipitate in suspension during aging. An elevated temperature is maintained during aging which is less than 70° C. The reaction will require more time to complete at lower temperatures. In the basic medium of this reaction, some of the ferrous carbonate is believed to react further to form ferrous hydroxide during aging in step c).

In step d), the iron-containing compound or compounds in the slurry are then oxidized by introducing oxygen-containing gas into the reactor contents by known methods such as flow through a stainless steel tube or a sparger. The oxygen-containing gas is preferably air, although oxygen may also be used. The reactor contents are stirred at a mixer speed of about 1600 rpm or agitated by some other method and are maintained at an elevated temperature between about 30° C. and about 70° C., preferably in the range of 50° C. to 60° C. if a growth modifier is present and in the range of 40° to 50° C. if no growth modifier is used. Lower oxidation temperatures will substantially reduce goethite particle size and aspect ratio, while oxidizing at temperatures greater than 70° C. increases the probability of forming hematite as an impurity. The temperature may be for example the same temperature that was maintained during the aging step. During oxidation, the gas flowrate is held constant for a period of time sufficient to oxidize 100% of the available iron, resulting in a deep yellow slurry of goethite particles.

A growth modifier, defined herein as a water-soluble compound for modifying goethite particle growth and morphology, is present in the reactor during the reaction. The addition of growth modifier is preferably made to the alkali carbonate solution before the iron containing solution is added, but may also occur after the two solutions are mixed, after the aging step, or during the oxidation step before up to 20% of the available iron in the slurry has been oxidized.

Use of a phosphate growth modifier in the inventive process is believed to incorporate P into the crystal structure of the resulting goethite. The growth modifier is added in a quantity sufficient to result in a concentration of 0.05% to 0.25% P by weight of goethite, preferably 0.1% P. Likewise, use of a silicate growth modifier is believed to incorporate Si into the crystal structure of the resulting goethite and is preferably added in a quantity which gives 0.05% to 0.5% Si by weight of goethite. Persons skilled in the art can evaluate and adjust the concentration of growth modifier to give the desired goethite particle morphology.

The oxidized slurry is washed by known methods to remove remaining soluble salts; for example, the slurry can be placed in a glass container where the suspended particles are allowed to settle and the supernatant liquid is decanted. Fresh deionized water is added and the slurry is agitated, followed by settling and decanting. The washing is continued until the wash water has a conductivity less than about 100 μmhos.

The goethite particles are collected by vacuum filtration, and dried for at least 8 hours at about 110° C. The particles may be given a coating of Al or Si to prevent sintering during further processing, methods for which are known in the art.

The goethite particles may be subjected to further reduction and oxidation reactions to produce magnetic iron oxide particles such as gamma-$Fe_2O_3$ useful in magnetic recording media. The method of conversion is conventional and can be carried out as described for example in U.S. Pat. No. 4,209,412.

In one embodiment of the multiple-rate process of this invention, goethite particles may be made according to the process described in the first embodiment, except the growth modifier is absent from the reaction, and the oxidation to goethite in step d) is carried out in two stages: In the first stage, up to 30% of the available iron is oxidized at an oxidation rate R by introducing the oxygen-containing gas at a first flow rate F1. R is calculated as the number of moles of iron oxidized per hour per liter of total batch volume, assuming that 100% of the oxygen in the flow at F1 is utilized during the first stage and thus represents a time average value. In the second stage, the gas flow rate is changed to F2 to oxidize the remaining percentage of available iron.

The temperature during step d) is greater than 30° C., preferably about 45° C.. The rate R is greater than about 0.06 mole/hr-1 and is preferably about 0.07 mole/hr-1. As R is increased by increasing the gas flow rate, oxygen is introduced too rapidly to be utilized at 100% efficiency. R is preferably not chosen to be greater than a value at which the oxygen is utilized at 90% efficiency. To complete the oxidation in a reasonable time, flow rate F2 is at least twice flowrate F1.

In another embodiment of the multiple-rate process; the gas flow rate may be changed twice during the oxidation in step d), so that oxidation occurs in three stages. In this embodiment, F2 is at least twice F1, and a third gas flow rate F3 is sufficiently greater than F2 to complete the oxidation efficiently without reducing the goethite particle length below a useful size of about 0.1 μm to 0.3 μm.

The multiple-rate process may further incorporate more than three oxidation stages to optimize goethite particle size and morphology and minimize reaction time.

To increase yield (and therefore the cost effectiveness) of the goethite formation process, concentration of ferrous ions are increased in the reactor. Higher iron concentration generally requires lower air flow rates to produce goethite particles of sufficient size. The rate of oxidation has been observed by the inventor to affect the goethite formation process with regard to particle size and size distribution. Unfortunately, lower oxidation rates, as required for higher iron concentrations, increase reaction time and produce particles with a broader size distribution while increasing the probability of forming cubic-shaped magnetite as an impurity. By means of the inventive process, it has been found that goethite particles of adequate size (0.1–0.3μm) having a small size distribution can be produced.

In another embodiment of the multiple-rate process, the oxidation in step d) may also be accomplished in three stages by oxidizing the slurry in a first stage at a first gas flowrate G1, allowing the slurry to age in a second stage for 15 to 120 minutes, and completing the oxidation in a third stage at a second flowrate G2. The flowrate G2 is preferably less than or equal to half the flowrate G1. In this embodiment, the intermediate aging step is for the purpose of obtaining sufficient particle size.

Chemical oxidizing agents chosen from those known in the art, such as hydrogen peroxide or chromic acid may also be added during oxidation in step d) to promote the formation of goethite nuclei with or without an accompanying change in oxidation rate.

A characterizing feature of the goethite particles of the present invention is their substantially uniform size and shape. The particles are spindle shaped with a length ranging from 0.1 to 0.3 μm. The aspect ratio (major axis:minor axis) of the particles is at least 3:1, and is preferably at least 5:1. The relative standard deviation of the particle length is 30% or smaller and more preferred is 22% or smaller. The goethite particles are substantially free of dendrites (branching), agglomerates and contaminants such as cubic magnetite.

To assess the size distribution, shape and overall appearance of the goethite particles, particle samples are placed on grids and photographed using transmission electron microscopy (TEM) at 42,000 times magnification. Aspect ratio and length are each measured from the micrograph and averaged for a 40 particle sample. Size distribution is calculated from the same 40-particle sample as the relative standard deviation (SD) of the particle length according to the formula:

$$\frac{\text{(standard deviation of particle length)} \times 100}{\text{(average particle length)}}$$

Lower relative standard deviation indicates improved, narrow size (or length) distribution. Relative SD is preferably ≦30%, more preferably ≦22%.

Surface area is measured using the BET method. The micrograph is also inspected for evidence of dendrites, agglomerates and contaminants.

The invention will be further clarified by the following examples, which are intended to be purely exemplary and not limiting.

EXAMPLE 1

This example describes the preparation of acicular goethite according to one embodiment of the invention.

A 3 liter stainless steel beaker with 154 mm inside diameter and an insertable baffle was used as the reactor. 144 g of anhydrous sodium carbonate and 0.72 g of tribasic sodium phosphate were placed in the reactor with 1000 ml of deionized water. The quantity of sodium phosphate used was sufficient to give an overall concentration of 0.1% P by weight of finished goethite.

The reactor was covered and placed on a heating unit connected to a temperature controller. The reactor contents were heated at 60° C. for a sufficient time to dissolve the reactants while stirring at 1600 rpm with a 70 mm diameter Cowles type mixing disk on a top entering shaft. During the dissolving, nitrogen gas was introduced through a stainless steel purge tube into the bottom of the reactor at 4 l/min. 186 g of ferrous sulfate heptahydrate was placed in an Erlenmeyer flask with 500 ml of deionized water to which 5 drops of 18M sulfuric acid had been added. The contents of the flask were stirred magnetically while purging the contents with 4 l/min nitrogen as described above until the ferrous sulfate dissolved.

The ferrous sulfate solution was added to the alkali carbonate solution in the reactor, resulting in the immediate formation of a whitish precipitate. The iron concentration in the resulting slurry was 0.45 moles per liter and the molar ratio of carbonate ions to ferrous ions was 2. The temperature was allowed to return to the 60° C. set point while nitrogen flowed at 4 l/ min into the reactor space above the slurry through a stainless steel tube to cover the slurry with an inert gas atmosphere. While maintaining the 60° C. temperature, the slurry was aged for 30 min while stirring at a speed of 1600 rpm.

The iron-containing compound or compounds present in the reactor were oxidized by introducing air into the bottom of the reactor through the purge tube while stirring at 1600 rpm and maintaining temperature at 60° C. The air flow rate F1 was maintained at 50 standard cc/min (standard is at 1 atomsphere pressure and 21° C.) for 76 minutes (the time required to oxidize 20% of the iron in the reactor contents assuming the oxygen in the air was 100% utilized), giving an oxidation rate R of 0.07 mole/hr-1. The air flow rate was changed to F2 at 100 cc/min for the remainder of the oxidation, during which the degree of oxidation then was measured using dichromate titration for Fe(II) ions. The final oxidized slurry containing goethite particles appeared deep yellow with no tinges of green, indicating that cubic magnetite contaminants were not present.

The slurry was washed with water repeatedly in a glass container to remove the remaining soluble salts until the conductivity of the wash water was less than 100 μmhos. The goethite particles were collected on a filter and dried overnight at 110° C.

The resulting acicular particles, photographed at 42,000 times magnification using transmission electron microscopy (TEM), are shown in FIG. 1. The particle length had a relative standard deviation of 13% with no apparent dendrites. The average aspect ratio of the particles was 5:1 and the average length 0.24 μm, with a BET specific surface area of 62 $m^2/g$.

EXAMPLES 2–5

Examples 2 through 5 were prepared in the same manner as Example 1, except for varying the concentration of growth modifier. Reaction conditions and particle property data for each example are shown in Table 1. Example 1 is also included in Table 1.

TABLE 1

| | Reaction conditions | | Particle properties | | | |
|---|---|---|---|---|---|---|
| Example | $Na_3PO_4 12 H_2O$ (g-in reactor) | P concent- ration (%) based on goethitie = 100% | avg. length (μm) | avg. aspect ratio | Relative SD (%) | surface area $(m^2/g)$ |
| 2 (comparative) | 0 | 0 | 0.67 | 14:1 | 54 | — |
| 3 | 0.36 | 0.05 | 0.51 | 9:1 | 20 | 56 |
| 4 | 0.54 | 0.075 | 0.33 | 7:1 | 15 | 65 |
| 1 | 0.72 | 0.10 | 0.24 | 5:1 | 13 | 62 |
| 5 | 1.80 | 0.25 | 0.09 | 3:1 | 11 | — |

Figure 2:
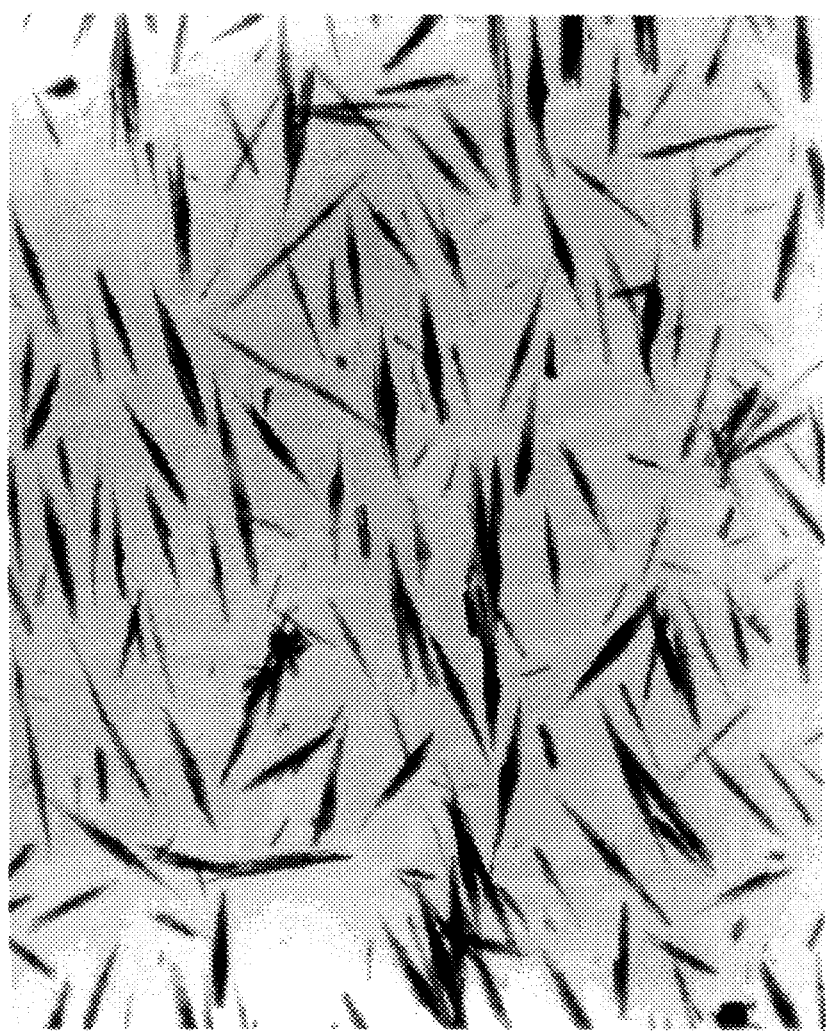
FIG. 2 is an electron photomicrograph at 26,000 times magnification showing goethite particles made according to comparative Example 2.

These examples demonstrate that both average particle length and aspect ratio decrease with increasing growth modifier concentration, but size distribution also becomes smaller. Particles prepared according to Comparative Example 2 with no growth modifier (shown in FIG. 2), had a significantly larger size distribution than particles of Example 1.

Figure 3:
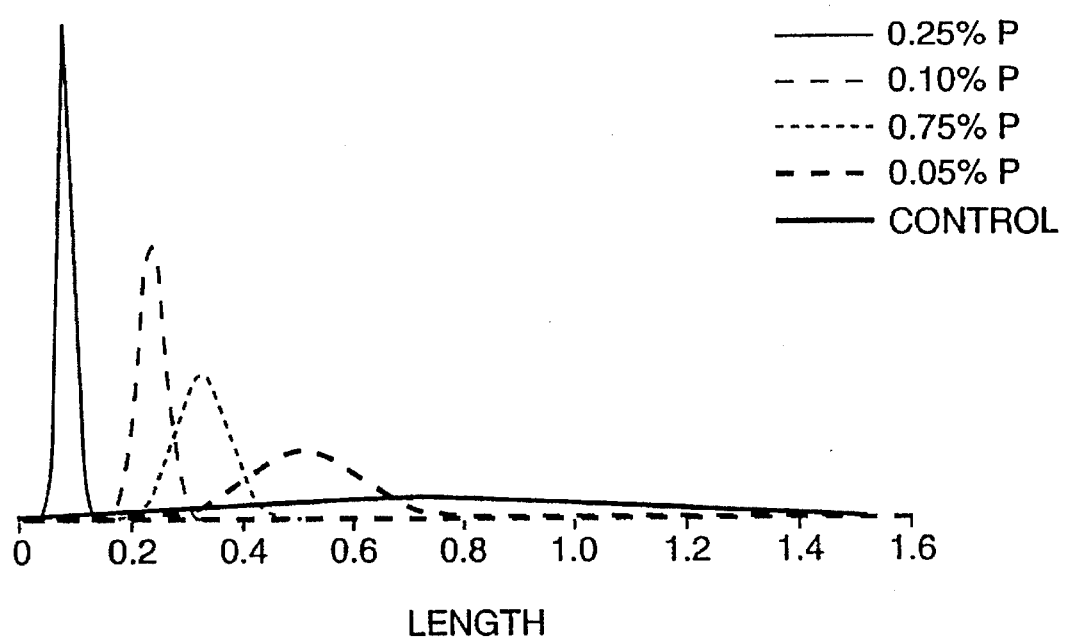
FIG. 3 is a graphical representation of length distribution of goethite particles made according to Examples 1–5. The length units of the x-axis are micrometers, and the y-axis is number of particles.

The effect of growth modifier concentration on particle length and size distribution is graphically illustrated in FIG. 3. Goethite particles prepared according to Examples 1 through 5 are represented as normal distribution curves for the length of the 40-particle samples used to calculate average length. These curves become successively narrower as P concentration increases, indicating smaller size distribution. At the same time, the peaks of the curves (representing length) become successively shorter.

EXAMPLES 6–9

Examples 6 through 9 were prepared in the same manner as Example 1, except for maintaining reaction temperature at 55° C. and changing the time of addition of the growth modifier.

Reaction conditions and particle property data for each example are shown in Table 2.

TABLE 2

| | Reaction conditions | Particle properties | | | |
|---|---|---|---|---|---|
| Example | Time of growth modifier addition | avg. length (μm) | avg. aspect ratio | Relative SD (%) | surface area $(m^2/g)$ |
| 6 | Beginning of step a) | 0.22 | 7:1 | 14 | 67 |
| 7 | End of step c) | 0.13 | 4:1 | 15 | — |
| 8 | Step d) after 10% oxidation | 0.37 | 6:1 | 22 | 59 |
| 9 | Step d) after 20% oxidation | 0.43 | 12:1 | 40 | — |

These examples demonstrate that the growth modifier of this invention may be added to the reaction with good results up to the time about 20% of the available iron has been oxidized in step d). Addition of the growth modifier at 20% oxidation, as in Example 9, resulted in an unacceptably large goethite size distribution.

EXAMPLES 10–12

Examples 10 through 12 were prepared in the same manner as in Example 1, except for using different growth modifiers including sodium, silicate, DEQUEST 2006 phosphonic acid from Monsanto, and sodium tripolyphosphate. Reaction conditions and particle property data for each example are shown in Table 3.

TABLE 3

| | Reaction Conditions | | | Particle properties | | |
|---|---|---|---|---|---|---|
| Example | Growth modifier | Quantity (g) | Concentration P or Si (%) | avg. length (μm) | avg. aspect ratio | Relative SD (%) |
| 10 | Na$_2$SiO$_3$.9H$_2$O | 0.60 | 0.1 Si | 0.27 | 4 | 19 |
| 11 | DEQUEST 2006 | 1.31 | 0.2 P | 0.44 | 10 | 14 |
| 12 | Na$_5$P$_3$O$_{10}$ | 0.47 | 0.2 P | 0.41 | 8 | 3 |

As shown in these examples, other materials may function as growth modifiers in the production of goethite according to this invention, producing particles with small size distribution and sufficiently high aspect ratio.

EXAMPLES 13–20

Examples 13 through 20 were prepared using the multiple-rate process of this invention with two oxidation stages. Procedures and reaction conditions were followed in the same manner as Example 1, except for omitting the addition of growth modifier, maintaining reaction temperature at 40° C., varying flowrates F1 and F2 during step d) and varying the percent oxidation during step d) at which F1 was changed to F2. In comparative Examples 13 and 14, flowrate was constant during oxidation. Reaction conditions and particle property data for each example are shown in Table 4.

TABLE 4

| | Reaction conditions | | | | Particle properties | | | |
|---|---|---|---|---|---|---|---|---|
| Example | F1 (cc/min) | F2 (cc/min) | R (moles/hr-l) | Flow change (% oxidation) | average length (μm) | avg. aspect ratio | Relative SD (%) | surface area (m$_2$/g) |
| 13 (comparative) | 50 | — | 0.07 | — | 0.16 | 6:1 | 51 | 124 |
| 14 (comparative) | 100 | — | 0.14 | — | 0.14 | 5:1 | 29 | — |
| 15 | 50 | 100 | 0.07 | 10 | 0.19 | 6:1 | 20 | 137 |
| 16 | 50 | 100 | 0.07 | 20 | 0.22 | 6:1 | 15 | — |
| 17 | 50 | 00 | 0.07 | 30 | 0.22 | 6:1 | 18 | 129 |
| 18 | 50 | 100 | 0.07 | 20 | 0.21 | 7:1 | 22 | — |
| 19 | 50 | 200 | 0.07 | 20 | 0.18 | 6:1 | 16 | — |
| 20 | 50 | 300 | 0.07 | 20 | 0.13 | 4:1 | 15 | — |

In comparative Example 13, the oxidation reaction was run at a slow constant flowrate which required more than 10 hours to complete and produced particles with a large size distribution. In Examples 15 through 17, the flowrate was changed from F1 to F2 at 10, 20 and 30% oxidation respectively. These oxidations all required approximately 6 hours to complete and produced particles with similar length and aspect ratio, having size distributions smaller than in Example 13. In Examples 19 and 20, flowrate F2 was increased to four and six times greater than flowrate F1, respectively. Particle size distributions were acceptable. Both the length and aspect ratios decreased as F2 became more rapid.

EXAMPLES 21–22

Examples 21 and 22 were prepared in the same manner as Examples 15 through 20 except for substituting flowrates G1 and G2 for flowrates F1 and F2, and introducing an aging period with no flow during step d) before commencing flowrate G2. The reaction conditions and particle property data for each example are shown in Table 5.

TABLE 5

| | Reaction conditions | | | | Particle properties | | |
|---|---|---|---|---|---|---|---|
| | | | Flow | | | | |
| Example | G1 (cc/min) | G2 (cc/min) | change (% oxid'n) | aging time (min) | avg. length (μm) | avg. aspect ratio | Relative SD (%) |
| 21 | 200 | 100 | 5 | 0 | 0.11 | 6:1 | 36 |
| 22 | 200 | 100 | 5 | 30 | 0.30 | 7:1 | 16 |

Particles produced without aging in step d) in Example 21, were considerably smaller and had larger size distribution than those made with an aging period in Example 22.

EXAMPLE 23

This example describes the preparation of goethite particles according to the multiple-rate process of the invention, using three oxidation stages.

591 l (156 gal) of deionized water were poured into a 946 l (250 gal) stainless steel reactor. The reactor had an inside diameter of 1067 mm (42 in), four baffles 88.9 mm (3.5 in) wide positioned radially along the reactor interior about 25 mm (one inch) from the reactor wall. Stirring was provided by a top-entering flat blade turbine with a diameter of 16 inches and five blades. The blades were each 51 mm (2 in) high.

68 kg (150 lbs) of anhydrous sodium carbonate powder were added to the reactor and dissolved with stirring at a rate of 300 rpm. During the dissolving, nitrogen gas was introduced through a stainless steel purge tube into the bottom of the reactor at 94.2 l/min (200 cfh).

A solution containing 0.35 kg/l (2.9 lb/gal) ferrous sulfate was prepared and the solution pH was raised to 4 to remove ferric ions by precipitating ferric hydroxide. The ferrous sulfate solution was decanted from the precipitate and the pH of the resulting solution was reduced to 2.2 for storage in a holding tank prior to use. 261 l (69 gal) of this solution were added to the sodium carbonate solution in the reactor. The resulting slurry was heated to 45° C. and aged with stirring at 300 rpm for 60 minutes.

The iron-containing compound or compounds present in the reactor were oxidized by introducing air into the reactor through a sparge ring located below the turbine mixer. The sparge ring was a 457 mm (18 in) diameter steel tube perforated with approximately 30 orifices of about 3 mm (⅛ in) diameter each around its perimeter. The ring acted as a manifold for increasing the uniformity of air distribution in the reactor. Throughout the oxidation, the temperature was maintained at 45° C. with 300 rpm stirring.

The first air flow rate F1 was maintained at 23.4 l/min (50 cfh) for 85 minutes (the time required to oxidize 25% of the iron in the reactor contents assuming the oxygen in the air was 100% utilized), giving an oxidation rate R of 0.07 mole/hr-1. The flow rate was then changed to F2, which was held at 58.8 l/min (125 cfh) for 3 hours until a total of 76% of the iron had oxidized. Finally, the third flow rate F3 was set at 91.8 l/min (195 cfh) to complete the oxidation.

The solid portion of the resulting slurry was washed repeatedly until the conductivity of the wash water was less than 200 μmhos. The goethite particles were filtered and collected using a plate and frame filter press and dried at 177° C. (350° F.) for 16 hours.

Figure 4:
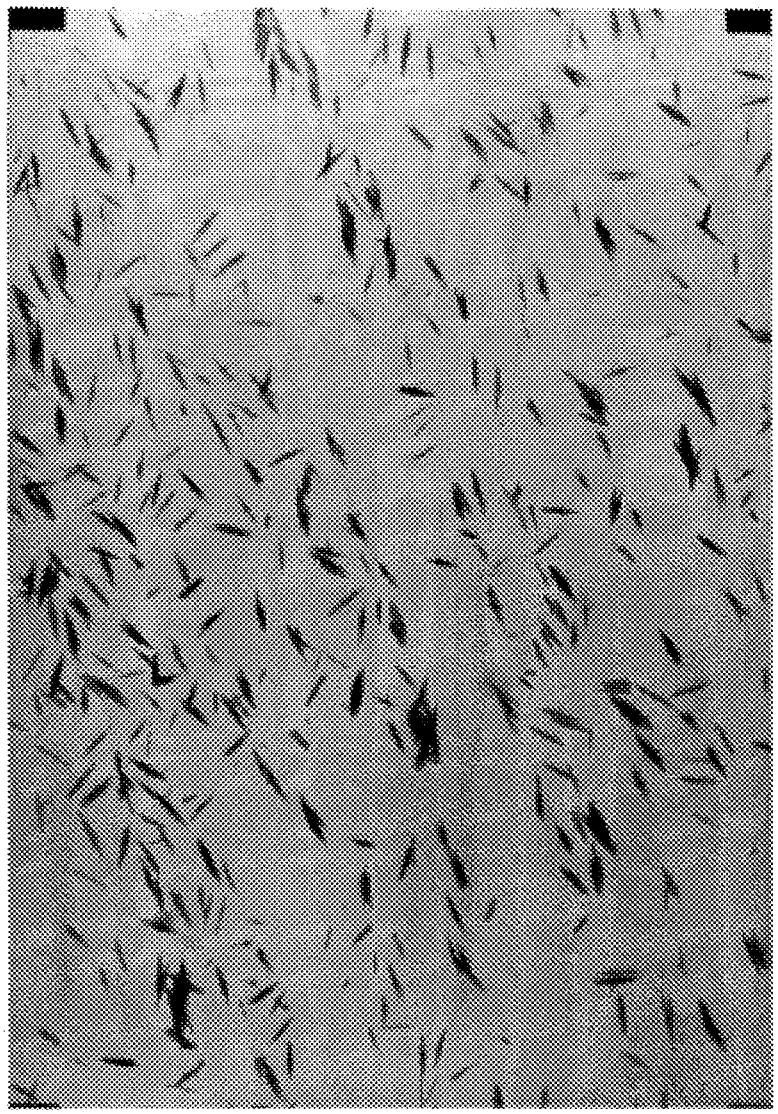
FIG. 4 is an electron photomicrograph at 26,000 times magnification showing goethite particles made according to another embodiment of the invention as described in Example 23.

An electron photomicrograph of the resulting particles is shown in FIG. 4 at 26,000 times magnification. The particles had an average length of 0.23 μm with a relative standard deviation of 17%, an aspect ratio of 9:1 and a BET specific surface area of 94 m$^2$/g.

What is claimed is:

1. A process of forming goethite particles comprising the steps of:
   a) mixing a water-soluble iron-containing compound and a water-soluble alkali carbonate compound into an aqueous solution having a molar excess of alkali carbonate sufficient to cause a chemical reaction between the two compounds, said aqueous solution being a basic solution having a pH in the range from 8 to 11, wherein the iron-containing compound and the alkali carbonate compound are salts the counterions of which in the solution do not interfere with the reaction to form goethite,
   b) reacting the resulting aqueous solution at a temperature sufficient to support the reaction between the iron-containing compound and the alkali carbonate compound in an inert gas atmosphere to yield a precipitate in suspension,
   c) aging the precipitate in suspension for a time and at a temperature sufficient to allow a ferrous carbonate intermediate to form,
   d) oxidizing the ferrous carbonate intermediate resulting from step c) by introducing an oxygen-containing gas at a controlled flowrate into the suspension resulting from step c) while maintaining a temperature sufficient to support the oxidation reaction, said gas introduced in at least two stages so that between 10 and 30% of the available iron in said suspension is oxidized in a first stage at a rate R while maintaining a first flowrate F1 of oxygen-containing gas, assuming that substantially all the oxygen introduced at flowrate F1 reacts with the iron-containing compound, and in a subsequent stage or stages the remaining percentage of available iron is oxidized at gas flowrates progressively greater than F1, wherein R is at least 0.07 mole of Fe/hr-liter of total reacting volume, thereby obtaining crystalline goethite particles being substantially free of dendrites.

2. The method of claim 1 wherein during step d) the oxygen-containing gas is introduced in two stages, the second stage is maintained at a flowrate F2, and F2 is at least two times greater than F1.

3. The method of claim 1 wherein during step d) the oxygen-containing gas is introduced in three stages, the second stage is maintained at a flowrate F2, the third stage is maintained at a flowrate F3, F2 is at least two times greater than F1, and F3 is sufficiently greater than F2 to complete the oxidation in a time short enough to reduce formation of magnetite as an impurity, compared to the amount of magnetite that would be produced if the reaction were completed at F2, and to produce goethite particles having a length in the range of 0.1 to 0.3 micrometers.

4. The method of claim 1 wherein the iron-containing compound is selected from the group consisting of ferrous sulfate, ferrous chloride, ferrous acetate, ferrous bromide, ferrous perchlorate, ferrous iodide, ferrous nitrate, ferrous thiocyanate and ferrous thiosulfate, and is present in a concentration of between 0.1–0.6 moles of Fe per liter of the slurry in step b).

5. The method of claim 1 wherein the alkali carbonate compound is selected from the group consisting of sodium carbonate, potassium carbonate, lithium carbonate, ammonium carbonate, cesium carbonate, rubidium carbonate, thallium carbonate, sodium bicarbonate, potassium bicarbonate, lithium bicarbonate, ammonium bicarbonate, cesium bicarbonate, and rubidium bicarbonate, and the molar ratio of alkali carbonate compound to iron-containing compound in step b) is in the range of 1.5 and 2.5.

6. The method of claim 1 wherein the temperature of step d) is at least 30° C.

7. The method of claim 1, further comprising the step of:
   e) introducing, in an amount effective to act as a growth modifier, a water-soluble compound selected from the group consisting of phosphates and silicates, said water-soluble compound being stable in an alkaline medium and capable of forming a complex with ferrous iron, into the reaction during either steps a), b), or c) or during step d) before 20% of the available iron in the suspension has been oxidized.

8. The process of claim 1, wherein ferrous hydroxide also is formed during step c).

9. A process of forming goethite particles comprising the steps of:
   a) mixing a water-soluble iron-containing compound and a water-soluble alkali carbonate compound into an aqueous solution having a molar excess of alkali carbonate sufficient to cause a chemical reaction between the two compounds, wherein the iron-containing compound and the alkali carbonate compound are salts the counterions of which in the solution do not interfere with the reaction to form goethite, b) reacting the resulting aqueous solution at a temperature sufficient to support the reaction between the iron-containing compound and the alkali carbonate compound in an inert gas atmosphere to yield a precipitate in suspension, c) aging the precipitate in suspension for a time and at a temperature sufficient to allow a ferrous carbonate intermediate to form, d) oxidizing the ferrous carbonate intermediate resulting from step c) by introducing an oxygen-containing gas at a controlled flowrate into the suspension resulting from step c) while maintaining a temperature sufficient to support the oxidation reaction, so that no more than 10% of the available iron in said suspension is oxidized while maintaining a flowrate G1, assuming that all the oxygen introduced at flowrate G1 reacts with the iron-containing compound, e) aging said suspension without oxygen addition for a time sufficient to substantially reduce the size distribution of finished goethite by comparison to the size distribution of goethite produced without aging, and f) oxidizing the remaining percentage of available iron at a flowrate G2, wherein flowrate G2 is less than or equal to half flowrate G1, thereby obtaining crystalline goethite particles being substantially free of dendrites.

10. The process of claim 9, wherein ferrous hydroxide also is formed during step c).

* * * * *

UNITED STATES PATENT AND TRADEMARK OFFICE
CERTIFICATE OF CORRECTION

PATENT NO.: 5,650,131
DATED: July 22, 1997
INVENTOR(S): Lown et al.

It is certified that error appears in the above-identified patent and that said Letters Patent is hereby corrected as shown below:

Col. 9, TABLE 4, Example 17, under column F2, "00" should be --100--.

Signed and Sealed this

Twelfth Day of May, 1998

Attest:

BRUCE LEHMAN

Attesting Officer

Commissioner of Patents and Trademarks